(12) United States Patent
Inoue

(10) Patent No.: US 7,058,842 B2
(45) Date of Patent: Jun. 6, 2006

(54) MICROCONTROLLER WITH MULTIPLE FUNCTION BLOCKS AND CLOCK SIGNAL CONTROL

(75) Inventor: Kazutoshi Inoue, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 524 days.

(21) Appl. No.: 10/351,527

(22) Filed: Jan. 27, 2003

(65) Prior Publication Data

US 2003/0145245 A1 Jul. 31, 2003

(30) Foreign Application Priority Data

Jan. 30, 2002 (JP) ............................. 2002-021297
Apr. 16, 2002 (JP) ............................. 2002-113243

(51) Int. Cl.
*G06F 1/04* (2006.01)
(52) U.S. Cl. ........................ 713/600; 713/320
(58) Field of Classification Search ............... None
See application file for complete search history.

(56) References Cited

U.S. PATENT DOCUMENTS

| 5,734,913 | A | * | 3/1998 | Iwamura et al. | ............ 713/322 |
| 5,761,466 | A | * | 6/1998 | Chau | ......................... 712/200 |
| 5,768,213 | A | * | 6/1998 | Jung et al. | ................... 365/233 |
| 5,847,450 | A | * | 12/1998 | Fink et al. | ................... 257/697 |
| 6,026,498 | A | * | 2/2000 | Fuse et al. | ................... 713/600 |
| 6,100,732 | A | * | 8/2000 | Penry et al. | ................ 327/144 |
| 6,145,020 | A | * | 11/2000 | Barnett | ......................... 710/8 |
| 6,317,804 | B1 | * | 11/2001 | Levy et al. | ................. 710/305 |
| 6,342,795 | B1 | * | 1/2002 | Ohta | .......................... 327/99 |
| 6,496,938 | B1 | * | 12/2002 | Fry et al. | .................... 713/322 |
| 6,825,689 | B1 | * | 11/2004 | Snyder | ........................ 326/41 |
| 2003/0200470 | A1 | * | 10/2003 | Yamada | ..................... 713/300 |

FOREIGN PATENT DOCUMENTS

| JP | 59-121519 | * | 7/1984 |
| JP | 64-086224 | * | 3/1989 |
| JP | 06-161938 | * | 6/1994 |

* cited by examiner

*Primary Examiner*—Chun Cao
(74) *Attorney, Agent, or Firm*—Rabin & Berdo, P.C.

(57) ABSTRACT

A microcontroller of the present invention includes: input/output ports; peripheral functional blocks, associated with the input/output ports, for performing predetermined functions; a clock signal generating circuit; a function selection decoder circuit for decoding a mode signal input from function selection pins and outputting a function selection signal; a clock signal controlling section for controlling supply/stop of a clock signal to each of the functional blocks in response to the function selection signal; and a port controlling block for setting functions of the input/output ports in response to the function selection signal.

7 Claims, 4 Drawing Sheets

F I G. 2

| FUNCTION SELECTION PINS | | | | FUNCTION SELECTION SIGNALS | | | |
|---|---|---|---|---|---|---|---|
| a | b | c | d | A | B | C | D |
| 0 | 0 | 0 | 0 | 0 | 0 | 0 | 0 |
| 1 | 0 | 0 | 0 | 1 | 0 | 0 | 0 |
| 0 | 1 | 0 | 0 | 0 | 1 | 0 | 0 |
| 1 | 1 | 0 | 0 | 1 | 1 | 0 | 0 |
| 1 | 1 | 1 | 1 | 1 | 1 | 1 | 1 |

US 7,058,842 B2

MICROCONTROLLER WITH MULTIPLE FUNCTION BLOCKS AND CLOCK SIGNAL CONTROL

BACKGROUND OF THE INVENTION

1. Field of the Invention

The present invention relates to a microcontroller, and more particularly, to a microcontroller including a plurality of functional blocks.

2. Description of the Related Art

In a conventional microcontroller, controlling supply/stop of a clock signal to each of functional blocks associated with input/output ports is effected by a controlling register provided for each of the input/output ports. In the conventional microcontroller, a central processing unit (CPU) executes a program, and the controlling registers are set according to results of the execution. Then, supply/stop of the clock signals to the functional blocks is controlled by setting the controlling registers.

However, in the conventional microcontroller, each of the input/output ports needs to be provided with the controlling register, and therefore, a problem exists that an overall size of the microcontroller becomes large. Further, after the microcontroller has been reset, the controlling registers are not set until the CPU executes the program, and therefore, functional setting of the input/output ports has not yet performed immediately after the reset of the microcontroller. Some types of external ICs being connected to the input/output ports require that the input/output ports are set immediately after the reset of the microcontroller and the microcontroller outputs a predetermined signal. In this case, the conventional microcontroller has a problem that it cannot output a predetermined signal immediately after being reset.

SUMMARY OF THE INVENTION

In order to solve the above-described problem, the present invention provides a microcontroller which includes a clock signal controlling section for controlling supply/stop of clock signals to functional blocks in response to externally supplied mode signals.

BRIEF DESCRIPTION OF THE DRAWINGS

FIG. 2 is a table showing a relationship between signals at function selection pins and function selection signals.

DESCRIPTION OF THE PREFERRED EMBODIMENTS

First Embodiment

Figure 1:
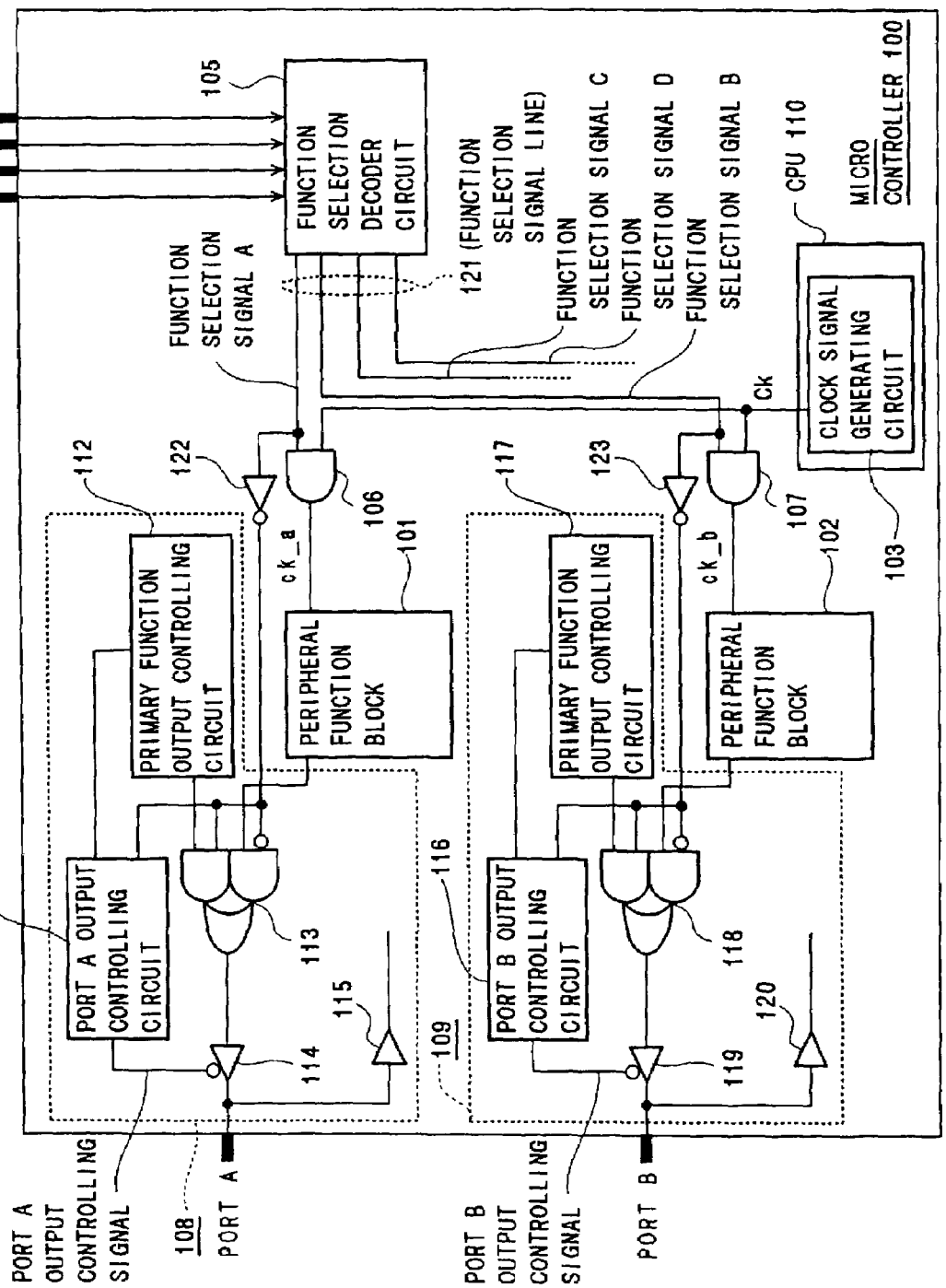
FIG. 1 is a circuit block diagram showing a configuration of a microcontroller according to a first embodiment of the present invention.

FIG. 1 is a circuit block diagram showing a configuration of a microcontroller according to a first embodiment of the present invention. The microcontroller 100 according to this embodiment includes: input/output ports (ports A and B); functional blocks (peripheral functional blocks 101 and 102), each associated with one of the ports A and B, for performing predetermined functions; a clock signal generating section (a clock signal generating circuit 103) which generates a clock signal Ck to be supplied to the peripheral functional blocks 101 and 102; function selection pins 104 (also referred to as "mode pins") to which an external signal is input; a decoding section (a function selection decoder circuit 105) which decodes the external signal (mode signal) input via the function selection pins 104; clock signal controlling sections 106 and 107 which selectively supply the clock signal from the clock signal generating circuit 103 to the peripheral functional blocks 101 or 102 in response to a function selection signal A or B output from the function selection decoder circuit 105; a port controlling block 108 for controlling input/output of data via the port A; and a port controlling block 109 for controlling input/output of data via the port B.

The ports A and B are used for inputting data from and outputting data to a device external to the microcontroller 100. The peripheral functional block 101 is, for example, a serial input/output interface. The peripheral functional block 101 performs a predetermined function synchronously with a clock signal ck_a supplied from the clock signal controlling section 106, and outputs the result of the execution to the port controlling block 108. The peripheral functional block 102 is, for example, a DRAM controller. The peripheral functional block 102 performs a predetermined function synchronously with a clock signal ck_b supplied from the clock signal controlling section 107, and outputs the result of the execution to the port controlling block 109. The clock signal generating circuit 103 is provided, for example, in a central processing unit (CPU) 110. The clock signal generating circuit 103 generates the clock signal Ck and outputs the clock signal Ck to the clock signal controlling sections 106 and 107. The function selection pins 104 are used for inputting the external signal (mode signal). In this embodiment, the function selection pins 104 includes four terminals a, b, c and d.

The function selection decoder circuit 105 decodes the external signal input via the function selection pins 104, and outputs the result of decoding (the function selection signal) to the clock signal controlling sections 106 or 107 via function selection signal lines 121. Here, referring to FIG. 2, a relationship between the external signals supplied to the function selection pins and the function selection signals, which are the results of decoding by the function selection decoding circuit 105. FIG. 2 shows a table illustrating a relationship between the signals at the function selection pins and the function selection signals. For example, if signals input to the terminals a, b, c, d of the function selection pins are respectively "1", "0", "0", "0", function selection signals A, B, C, D output from the function selection decoder circuit 105 are respectively "1", "0", "0", "0". Further, if signals input to the terminals a, b, c, d of the function selection pins are respectively "0", "1", "0", "0", function selection signals A, B, C, D output from the function selection decoder circuit 105 are respectively "0", "1", "0", "0".

The clock signal controlling section 106 comprises, for example, an AND circuit. The clock signal Ck is input to one of two input terminals of the clock signal controlling section 106, and the function selection signal A is input to the other of the input terminals of the clock signal controlling section 106. The clock signal controlling section 106 outputs the clock signal ck_a, whose waveform is the same as that of the input clock signal Ck, when a logic value of the function selection signal A is "1", and supplies the clock signal ck_a to the peripheral functional block 101. When a logic value of the function selection signal A is "0", the clock signal controlling section 106 keeps outputting a logic value of "0". In other words, the clock signal controlling section 106 supplies the clock signal ck_a to the peripheral functional block 101 when the function selection signal A is "1", and stops supplying the clock signal to the peripheral functional block 101 when the function selection signal A is "0". In this manner, the clock signal controlling section 106 selectively supplies the clock signal Ck from the clock signal generating circuit 103 to the peripheral functional block 101 in response to the function selection signal A.

Similarly, the clock signal controlling section 107 comprises, for example, an AND circuit. The clock signal Ck is input to one of two input terminals of the clock signal controlling section 107, and the function selection signal B is input to the other of the input terminals of the clock signal controlling section 107. The clock signal controlling section 107 outputs the clock signal ck_b, whose waveform is the same as that of the input clock signal Ck, when a logic value of the function selection signal B is "1", and supplies the clock signal ck_b to the peripheral functional block 102. When a logic value of the function selection signal B is "0", the clock signal controlling section 107 keeps outputting a logic value of "0". In other words, the clock signal controlling section 107 supplies the clock signal ck_b to the peripheral functional block 102 when the function selection signal B is "1", and stops supplying the clock signal to the peripheral functional block 102 when the function selection signal B is "0". In this manner, the clock signal controlling section 107 selectively supplies the clock signal Ck from the clock signal generating circuit 103 to the peripheral functional block 102 in response to the function selection signal B.

The port controlling block 108 includes: a port A output controlling circuit 111; a primary function output controlling register 112; a multiplexer 113 for outputting either an output from the primary function output controlling register 112 or an output from the peripheral functional block 101 in response to a port A output controlling signal; an output buffer 114 for receiving the output from the multiplexer 113 and outputting the signal to the port A; and an input buffer 115 for transmitting a signal input from an external device via the port A to an internal circuit.

The port controlling block 109 includes: a port B output controlling circuit 116; a primary function output controlling register 117; a multiplexer 118 for outputting either an output from the primary function output controlling register 116 or an output from the peripheral functional block 102 in response to a port B output controlling signal; an output buffer 119 for receiving the output from the multiplexer 118 and outputting the signal to the port B; and an input buffer 120 for transmitting a signal input from an external device via the port B to the internal circuit.

Operation of the microcontroller according to this embodiment will now be described. In this example, operation of the microcontroller when the peripheral functional block 101 performs a predetermined function and outputs the result to an external device via the port A, and an external signal is input via the port B and is transmitted to the internal circuit by the input buffer 120 is described. At this time, the peripheral functional block 102 becomes inactive (in a non-operating state).

First, an external signal indicating a state in which values at the terminals a, b, c, d are respectively "1", "0", "0", "0", is input to the terminals of the function selection pins 104. The function selection decoder circuit 105 decodes the external signal input via the function selection pins 104 and outputs the result of decoding as function selection signals A, B, C, D. In this embodiment, as described above with reference to FIG. 2, the function selection signals A, B, C, D are "1", "0", "0", "0" respectively. In response to the function selection signal A having the logic value of "1", the clock signal controlling section 106 supplies the clock signal ck_a to the peripheral functional block 101. In response to the function selection signal B having the logic value of "0", the clock signal controlling section 107 stops supplying the clock signal to the peripheral functional block 102.

Being supplied with the clock signal ck_a, the peripheral functional block 101 becomes active (in an operating state) and performs the predetermined function. Since supply of the clock signal ck_b is stopped, the peripheral functional block 102 is inactive (in a non-operating state).

An operation of outputting a signal via the port A is described. In response to an inversion signal (logic value "0") of the function selection signal A (logic value "1"), the multiplexer 113, which is provided in the port controlling block 108, selects the signal output from the peripheral functional block 101 and outputs the signal to the output buffer 114. In response to the port A output controlling signal, the output buffer 114 becomes active and outputs the signal from the peripheral functional block 101 to an external device via the port A.

An operation of inputting an external signal via the port B is described. In response to the function selection signal B having the logic value of "0", the clock signal controlling section 107 stops supplying the clock signal to the peripheral functional block 102. Since supply of the clock signal is stopped, the peripheral functional block 102 becomes inactive (in a non-operating state). In response to the port B output controlling signal output from the port B output controlling circuit 116, the output buffer 119 becomes inactive. When the output buffer 119 becomes inactive, a function of outputting a signal via the port B is stopped, however, input of an external signal via the port B can still be preformed. The signal input to the microcontroller 100 via the port B is transmitted to the internal circuit by the input buffer 120.

As described in detail above, the microcontroller according to this embodiment includes the clock signal controlling sections 106 and 107 for controlling supply/stop of the clock signal Ck to the functional blocks (the peripheral functional blocks 101 and 102) in response to the externally-supplied mode signal. Therefore, there is no need of providing a register for controlling supply/stop of the clock signal for each of the input/output ports, thereby allowing to reduce a size of the microcontroller. Further, since the microcontroller according to the embodiment includes the above-described clock signal controlling sections 106 and 107, function setting of the input/output ports can be performed immediately in response to the mode signal even immediately after the microcontroller has been reset, and a predetermined signal to external ICs, which are connected to the input/output ports, can be output immediately after the microcontroller has been reset.

Second Embodiment

Figure 3:
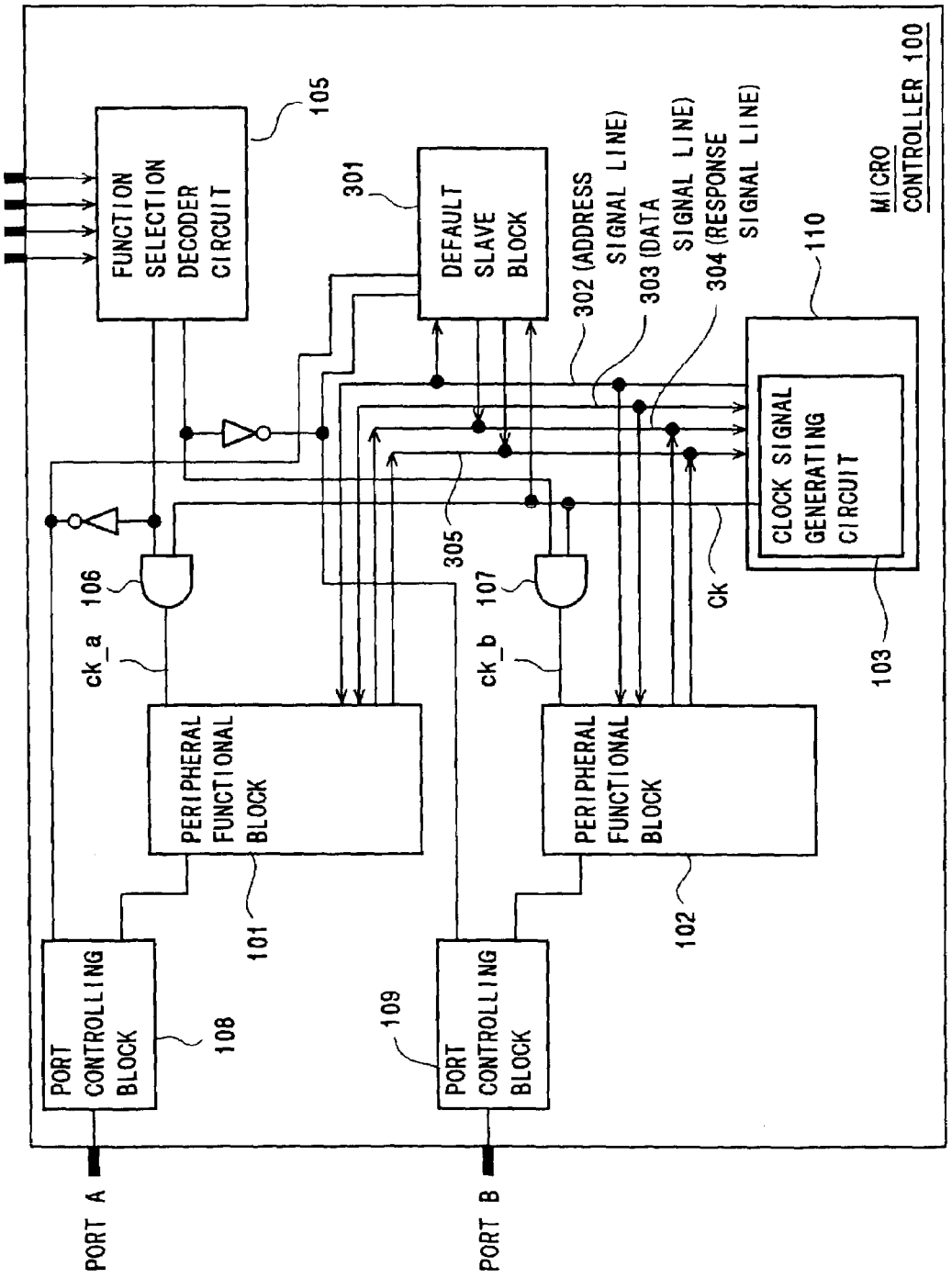
FIG. 3 is a circuit block diagram showing a configuration of a microcontroller according to a second embodiment of the invention.

A microcontroller according to a second embodiment of the invention will now be described. FIG. 3 is a circuit block diagram showing a configuration of the microcontroller according to the second embodiment of the invention. In addition to the elements of the microcontroller of the first embodiment shown in FIG. 1, the microcontroller of this embodiment further includes a default slave block 301, which outputs a response signal in place of the peripheral functional blocks when they are accessed from the CPU while the clock signal is not supplied thereto. The default slave block 301 has a function to output a response signal RESP and a bus-ready signal READY in place of the peripheral functional blocks when they are accessed while the clock signal is not supplied thereto.

Figure 4:
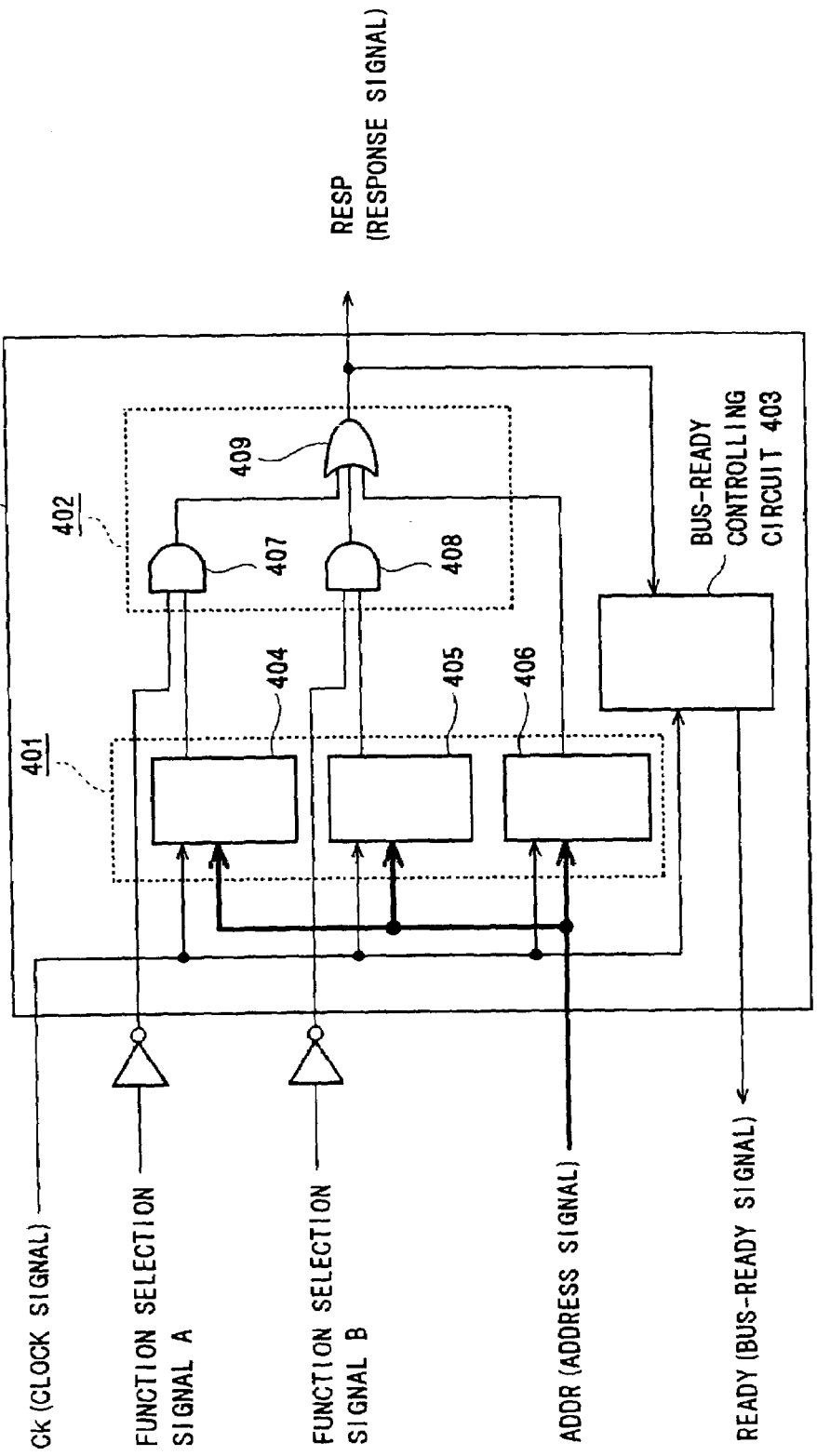
FIG. 4 is a block diagram showing a configuration of a default slave block in FIG. 3.

Now, referring to FIG. 4, the default slave block 301 is described in detail. FIG. 4 is a circuit block diagram showing a configuration of the default slave block 301. The default slave block 301 includes: a decoding section 401 for decoding an address signal ADDR; a logic circuit section 402 for outputting the response signal RESP on the basis of the function selection signals A and B and a signal output from the decoding section 401; and a bus-ready controlling circuit 403 for outputting the bus-ready signal READY on the basis of the response signal RESP.

The decoding section 401 comprises decoding circuits 404, 405 and 406. In this embodiment, the decoding circuit 404 outputs a signal having a logic value of "1" when the address signal ADDR corresponds to the peripheral functional block 101 (see FIG. 1) (i.e., when the address signal ADDR indicates the address of the block 101), and outputs a signal having a logic value of "0" when the address signal ADDR does not correspond to the peripheral functional block 101. The decoding circuit 405 outputs a signal having a logic value of "1" when the address signal ADDR corresponds to the peripheral functional block 102 (see FIG. 1), and outputs a signal having a logic value of "0" when the address signal ADDR does not correspond to the peripheral functional block 102. The decoding circuit 406 outputs a signal having a logic value of "1" when the address signal ADDR corresponds to neither the peripheral functional block 101 nor 102, and outputs a signal having a logic value of "0" when the address signal ADDR corresponds to one of the peripheral functional blocks 101 and 102.

The logic circuit section 402 comprises AND circuits 407 and 408 and an OR circuit 409. Input to the AND circuit 407 includes an inverse signal of the function selection signal A and an output signal from the decoding circuit 404. Input to the AND circuit 408 includes an inverse signal of the function selection signal B and an output signal from the decoding circuit 405. Input to the OR circuit 409 includes an output signal from the AND circuit 407, an output signal from the AND circuit 408 and an output signal from the decoding circuit 406. The response signal RESP, which is an output signal from the OR circuit 409, has a logic value of "1" when the output signal from the AND circuit 407 has a logic value of "1", when the output signal from the AND circuit 408 has a logic value of "1", or when the output signal from the deciding circuit has a logic value of "1". In other words, the response signal RESP has a logic value of "1" to indicate that an abnormal access is made when the peripheral functional block 101 is accessed while the clock signal is not supplied thereto, when the peripheral functional block 102 is accessed while the clock signal is not supplied thereto, or when there is no peripheral functional block which corresponds to the address signal ADDR. If none of them is the case, the response signal RESP has a logic value of "0".

The bus-ready controlling circuit 403 outputs the bus-ready signal READY in response to the response signal RESP. The bus-ready controlling circuit 403 outputs the bus-ready signal READY having a logic value of "1" when the response signal RESP has a logic value of "1". In other words, the bus-ready controlling circuit 403 outputs the bus-ready signal READY having a logic value of "1" to instruct to stop accessing over the bus when an abnormal access is made (when the response signal RESP has a logic value of "1").

As described above, the default slave block 301 outputs the response signal RESP and the bus-ready signal READY to the CPU 110 in place of the peripheral functional blocks when they are accessed while the clock signal is not supplied thereto.

Next, operation of the microcontroller according to this embodiment is described. In this example, operation of the microcontroller when the peripheral functional block 101 is accessed while the clock signal is not supplied thereto is described. First, as shown in FIG. 4, an external signal indicating a state in which values at the terminals a, b, c, d are respectively "1", "0", "0", "0", is input to the terminals of the function selection pins 104. The function selection decoder circuit 105 decodes the external signal input via the function selection pins 104 and outputs the result of decoding as function selection signals. In this embodiment, values of the function selection signals A and B are respectively "1" and "0". In response to the function selection signal A having the logic value of "1", the clock signal controlling section 106 supplies the clock signal ck_a to the peripheral functional block 101. In response to the function selection signal B having the logic value of "0", the clock signal controlling section 107 stops supplying the clock signal ck_b to the peripheral functional block 102. Since supply of the clock signal ck_b is stopped, the peripheral functional block 102 becomes inactive (in a non-operating state).

Now, a case in which the peripheral block 102 is accessed while the clock signal ck_b is not supplied thereto is described. First, the address signal ADDR corresponding to the peripheral functional block 102 is output from the CPU 110 to an address signal line 302, and the peripheral functional block 102 is accessed. At this time, since the clock signal ck_b is not supplied to the peripheral functional block 102, the peripheral functional block 102 is unable to perform the predetermined function as well as unable to output the response signal RESP and the bus-ready signal READY. Therefore, the default slave block 301 outputs the response signal RESP and the bus-ready signal READY to the CPU 110 in place of the peripheral functional block 102.

Now, referring to FIGS. 3 and 4, operation of the default slave block 301 is described. The address signal ADDR corresponding to the peripheral functional block 102 is input to the decoding section 401 included in the default slave block 301. The decoding section 401 decodes the input address signal ADDR. Since the address signal ADDR does not correspond to the peripheral functional block 101, the decoding circuit 404 outputs a signal having a logic value of "0". Since the address signal ADDR corresponds to the peripheral functional block 102, the decoding circuit 405 outputs a signal having a logic value of "1". Since the address signal ADDR corresponds to the peripheral functional block 102 (since there is the peripheral functional block corresponding to the address signal ADDR), the decoding circuit 406 outputs a signal having a logic value of "0". The signal having the logic value of "0" output from the decoding circuit 404 and an inverse signal (logic value "0") of the function selection signal A (logic value "1") are input to the AND circuit 407. The AND circuit 407 performs AND operation on these two input signals and outputs a signal having a logic value of "0". To the AND circuit 408, the signal having the logic value of "1" output from the decoding circuit 405 and an inverse signal (logic value "1") of the function selection signal B (logic value "0") are input. The AND circuit 408 performs AND operation on these two input signals and outputs a signal having a logic value of "1". The OR circuit 409 performs OR operation on the output signal from the AND circuit 407 (logic value "0"), the output signal from the AND circuit 408 (logic value "1") and the output signal from the decoding circuit 406 (logic value "0"), and outputs a signal having a logic value of "1". The signal output from the OR circuit 409 is the response signal RESP. Then, the response signal RESP is input to the bus-ready controlling circuit 403. In response to the response signal RESP, the bus-ready controlling circuit 403 outputs the bus-ready signal READY having a logic value of "1". In response to the response signal RESP having the logic value of "1" and the bus-ready signal READY having the logic value of "1", the CPU 110 stops accessing the peripheral functional block 102.

As described above in detail, the microcontroller according to this embodiment has the responding section (the default slave block 301). Thus, when the functional block (the peripheral functional block) is accessed while a clock signal is not supplied thereto, the responding section (the default slave block 301) outputs the response signal in place of the functional block (the peripheral functional block) being inactive in order to stop the abnormal (erroneous) access. By stopping the abnormal (erroneous) access, power consumption by an abnormal (erroneous) access operation can be prevented.

What is claimed is:

1. A microcontroller comprising:
   input/output ports;
   functional blocks, each associated with one of the input/output ports, for performing predetermined functions;
   a clock signal generating section, which generates a clock signal supplied to each of the functional blocks;
   a clock signal controlling section, which controls supply/stop of the clock signal to the functional blocks in response to an externally-supplied mode signal;
   a responding section, which outputs a response signal in place of the functional blocks, when the functional blocks are accessed while the clock signal is not supplied thereto, the signal indicating that the access is and a central processing unit, which outputs an address signal to the functional blocks, wherein the responding section outputs the response signal based on the address signal and the mode signal.

2. The microcontroller according to claim 1, wherein the responding section outputs the response signal to the central processing unit to instruct the central processing unit to stop accessing the functional blocks.

3. The microcontroller according to claim 1, wherein the responding section comprises a decoding circuit, which decodes the address signal;
   and a logic circuit section, which outputs the response signal based on a signal output from the decoding circuit and the function selection signal.

4. The microcontroller according to claim 1, further comprising a decoding section, which decodes the mode signal and outputs a result of decoding as a function selection signal, wherein the clock signal controlling section controls supply/stop of the clock signal to the functional blocks in response to the function selection signal.

5. The microcontroller according to claim 4, further comprising a central processing unit, which outputs an address signal to the functional blocks, wherein the responding section outputs the response signal based on the address signal and the mode signal.

6. The microcontroller according to claim 5, wherein the responding section outputs the response signal to the central processing unit to instruct the central processing unit to stop accessing the functional blocks.

7. The microcontroller according to claim 5, wherein the responding section comprises
   a decoding circuit for decoding the address signal, and
   a logic circuit section for outputting the response signal based on the signal output from the decoding circuit and the function selection signal.

* * * * *